United States Patent

Kullendorff et al.

[11] Patent Number: 4,813,381
[45] Date of Patent: Mar. 21, 1989

[54] CONTROLLING THERMAL TRANSMISSION RATE AT A FAST FLUIDIZED BED REACTOR

[75] Inventors: Anders N. Kullendorff, Askim; Björn G. Jansson, Västra Frölunda; Jan I. Olofsson, Göteborg, all of Sweden

[73] Assignee: Gotaverken Energy Systems AB, Göteborg, Sweden

[21] Appl. No.: 88,537

[22] Filed: Aug. 20, 1987

Related U.S. Application Data

[63] Continuation of Ser. No. 854,294, Apr. 21, 1986, abandoned.

[30] Foreign Application Priority Data

Apr. 30, 1985 [SE] Sweden .................. 85021/04

[51] Int. Cl.$^4$ ............................................... F22B 1/00
[52] U.S. Cl. .................................. 122/4 D; 110/245; 165/104.16
[58] Field of Search .................. 110/245; 431/7, 170; 165/104.16; 122/4 D

[56] References Cited

U.S. PATENT DOCUMENTS

| | | |
|---|---|---|
| 4,154,581 | 5/1979 | Nack et al. |
| 4,165,717 | 8/1979 | Reh et al. |
| 4,421,036 | 12/1983 | Brahnmstrom et al. ....... 110/245 X |
| 4,442,796 | 4/1984 | Strohmeyer, Jr. ................. 122/4 D |
| 4,475,472 | 10/1984 | Adrian et al. ................... 122/4 D X |
| 4,488,512 | 12/1984 | Boyle ................................... 122/4 D |
| 4,538,549 | 9/1985 | Stromberg. |
| 4,552,078 | 11/1985 | Morin et al. ................... 122/4 D X |
| 4,674,560 | 6/1987 | Marcellin ................................. 165/1 |

FOREIGN PATENT DOCUMENTS 0093060 2/1983 European Pat. Off.
0082673 6/1983 European Pat. Off.

OTHER PUBLICATIONS

K. D. Kiang et al., "Heat Transfer in Fast Fluidized Beds", Engineering Foundation Conference held at Asilomar Conf. Grounds, Pacific Grove, CA., Jun. 15-20, 1975.

A. A. Godel, "The Most Advanced Method for Burning Coal: IGNIFLUID, Fluidized Bed Combustion Process", 1965.

Primary Examiner—Edward G. Favors
Attorney, Agent, or Firm—Wegner & Bretschneider

[57] ABSTRACT

A method and means for regulating the thermal transmission rate at a fast fluidized bed reactor, which comprises a combustion chamber, a cyclone separator and a lock between the separator and the combustion chamber. The method comprises varying heat absorption to the conductive parts of the combustion chamber through changing the particle density in the fluidized bed when altering the load and/or the kind of fuel. This imples adding of fine grain, inert particles to the bed, or alternatively removing large size particles from the bottom of the combustion chamber and fine grain particles from the lock, respectively.

4 Claims, 1 Drawing Sheet

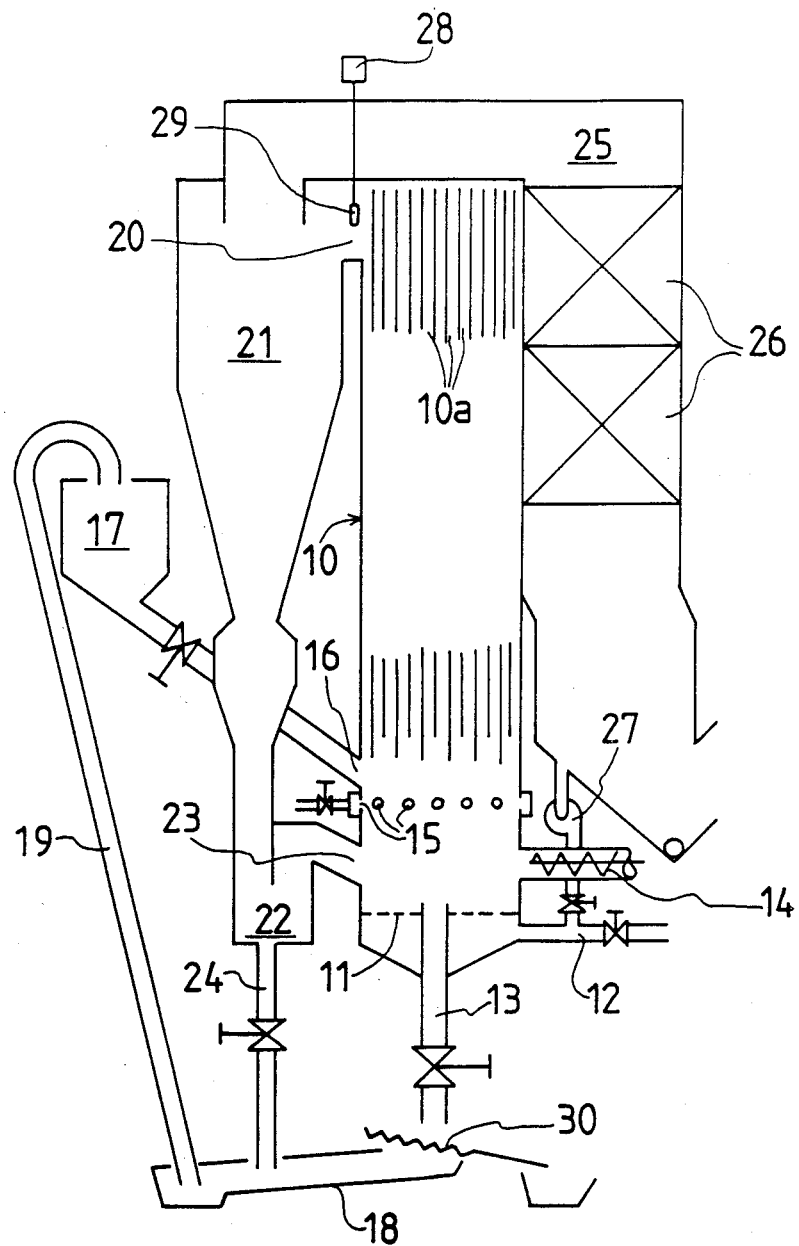

CONTROLLING THERMAL TRANSMISSION RATE AT A FAST FLUIDIZED BED REACTOR

This application is a continuation of U.S. application Ser. No. 854,294, filed Apr. 21, 1986, abandoned.

This invention relates to methods of operating a fast fluidized bed reactor comprising a combustion chamber, a cyclone separator and a lock connected between the separator and an inlet into the combustion chamber.

When different kinds of fuel, e.g. coal and biomass are burned, a certain specific rate of heat gas is generated for each kind of fuel. A reactor arranged for operation with a circulating fluidized bed, CFB, has optimal operating conditions at 850° C. The absorption of heat within the convection parts of a CFB-reactor, downstream of the cyclone separator, can not be modified without significant re-design, when a certain fuel is substituted for another kind of fuel.

When operating a CFB-reactor with different kinds of fuel, it must be possible to:

1. adjust the absorption of heat within the reactor chamber in order to maintain the exhaust temperature at 850° C. in the exit flue, depending on variation in load, and
2. adjust the amount of exhaust gas, so it will be as constant as possible, for different kinds of fuel. The absorption of heat in the reactor takes place both through radiation and convection. The latter is highly dependant on the particle density, thus that the rate of heat absorption is increased when the particle density in the exhausts is increased.

Apart from fuel there is also supplied chemically inert granular material, and when sulphur containing fuel is used, limestone is also added to the bed material. The inert bed material, e.g. quarts sand, is only little reduced in size during the operation of the reactor, but the limestone is reduced by erosion, after some time.

Each composition of bed material has its special fluidizing properties, i.e. needs different velocity and pressure of fluidization gas and temperature to be properly fluidized and carried away by the exhaust gas stream.

The amount of combustion air is regulated in accordance with the supply of fuel at various reactor loads.

One way to alter the particle density and thereby the heat absorption in the reactor, is to change the proportions of primary and secondary fluidizing gas. In this way more or less bed material can be "lifted" up to the level of the secondary ports through variations in the amount of primary gas or the velocity of this gas.

The object of the present invention is to improve the operation method of a CFB-reactor comprising a combustion chamber, a cyclone separator and a lock between the separator and the combustion chamber, enabling the use of different kinds of fuel, without impairing the operation conditions and the thermal efficiency.

To this end fine size particles are removed from the lock, making the particle size in the system generally larger when a fuel with a high thermal value is used, and when a lower reactor load is desired, or adding fine grain particles from a reservoir, while removing larger size particles from the bottom of the combustion chamber, making the particle size in the system generally smaller when a fuel with a low thermal value is used, and when a higher reactor load is desired.

The means for varying the rate of heat absorption in a CFB-reactor comprises a valve operated outlet in the lock for the removal of the fine grain particles from the fluidized bed system, means for transporting said fine size particles up into a reservoir for inert bed material, and means for regulating an outlet at the bottom of the reactor chamber for the removal of large size fuel and ash particles.

The rate of heat absorption can be altered through this variation of the particle composition in the bed in order to adapt the temperature of the reactor to the thermal value of the fuel. This is possible because the lower part of the bed, above the distributor plate, mainly contains particles of relatively large size, while the particles of smaller size generally are blown out of the reactor together with the exhaust gases, and are separated in the cyclone separator, to be collected within a lock for return to the reactor.

The general particle size in the CFB-system will be smaller if larger size particles are removed directly from the outlet in the distributor plate, and if necessary at the same time adding fresh inert bed material from the outside, resulting in a higher particle density in the area above the secondary gas ports. This means that the absorption of heat within the conductive parts of the reactor will be larger and that optimal operating conditions will be maintained while using a fuel with a higher thermal value.

On the other hand a generally larger particle size in the CFB-system can be obtained if fine particles are removed from the lock between the cyclone separator and the reactor reducing the particle density in the reactor above the secondary ports. This reduces the heat absorption within the conductive parts of the reactor to maintain optimal operating conditions while using a fuel with a lower thermal value.

The invention will now be described with reference to the accompanying drawing, which shows a fast fluidized bed reactor according to the invention in a diagrammatic vertical sectional view.

The reactor chamber is represented generally by the numeral 10, and comprises a distributor plate 11 for primary fluidizing and combustion gas supplied by a conduit 12. The distributor plate has a central outlet 13 for bed material, which can be opened and closed by means of a valve. Fuel is fed to the combustion chamber via a screw conveyor 14, and is lifted by the fluidizing gas above the ports 15 for the secondary gas. The reactor chamber 10 has cooling water or steam carrying tubes 10a in the chamber wall above the level of the ports 15.

Inert particles are fed to the chamber 10 via an inlet 16 from a container 17, which is connected by means of a vertical conveyor 19 to a collecting vessel 18 below the outlet 13 of the chamber.

The particles of the fluidized bed circulate via an exhaust outlet 20 at the top of the chamber 10, through a cyclone separator 21 and a lock 22 back to the chamber 10 via an outlet 23 below the ports 15 for secondary gas.

The lock 23 has an outlet 24, which can be opened or closed by means of a valve, and terminates in the collecting vessel 18.

The exhaust leaves the cyclone separator 21 via a conduit 25, having heat absorbing conductive means 26. The exhaust can also be returned to the chamber 10 via a fan 27 and a branch conduit into the main conduit of primary fluidization gas.

A thermal sensor 29 is connected to a governing unit 28 and detects the conditions in the exhaust outlet 20 and especially if the temperature differs from the correct, i.e. 850° C.

If the temperature increases above this level, e.g. while one shifts from one fuel to another, e.g. a biomass with a higher dryness, the heat transfer to the tubes 10a can be reduced by removing fine grain particles from the lock 22. This fine grain material is transferred to the container 17 for inert bed material by means of the verticle conveyor 19. Fine grain particles can also be removed via the outlet 13 by means of a screen 30 separating the fine grain particles from the coarse ash material.

Thus the operating conditions of the reactor are maintained at an optimal level in a simple and efficient way.

It will be apparent to those of ordinary skill in the art that various modifications and variations can be made to the above-described embodiment of the invention without departing from the scope of the appended claims. The means for removing particles and feeding inert material can, for example, be designed differently.

We claim:

1. A method for operating a fast circulating fluidized bed reactor comprising: a vertical reactor chamber having water cooled walls; a perforated bottom; valve means for selectively controlling the withdrawal of large-sized bed material from the space above said perforated bottom; means for supplying coarse solid fuel to said reactor chamber; means for adding fine grain inert bed material to said reactor; a cyclone separator connected to the upper portion of said reactor chamber; a lock between the separator and the lower portion of the reactor chamber; further valve means for selectively controlling the withdrawal of bed material from said lock; transfer means to return bed material withdrawn from said lock to said means for adding inert bed material; means for supplying primary fluidizing gas below said perforated bottom and means for supplying secondary fluidizing gas above said perforated bottom, both of said means for supplying fluidizing gas operating in proportion to fuel occasionally introduced to said reactor; and means for changing the ratio between said primary and said secondary gases; said method comprising controlling the heat absorption to the walls of said reactor chamber in relation to at least one of changes in load and kind of fuel by altering the mean particle size in the fluidized bed by either: (A) operating said means for changing the ratio between said primary fluidizing gas and said secondary fluidizing gas, operating said means for adding inert bed material, and operating said valve means for removing large size material from the bed of said reactor chamber, or (B) operating said means for changing the ratio between said primary fluidizing gas and said secondary fluidizing gas and operating said further means for removing fine grain material from said lock, thereby altering the density of the particle suspension above the means for supplying secondary fluidizing gas.

2. The method of claim 1 wherein controlling the heat absorption to the walls of said reactor in relation to at least one of changes in load and kind of fuel by altering the mean particle size in the fluidized bed is performed by operating said means for changing the ratio between said primary fluidizing gas and said secondary fluidizing gas, operating said means for adding inert bed material, and operating said valve means for removing large size material from the bed of said reactor chamber, thereby altering the density of the particle suspension above the means for supplying secondary fluidizing gas.

3. The method of claim 1 wherein controlling the heat absorption to the walls of said reactor in relation to at least one of changes in load and kind of fuel by altering the mean particle size in the fluidized bed is performed by operating said means for changing the ratio between said primary fluidizing gas and said secondary fluidizing gas and operating said further means for removing fine grain material from said lock, thereby altering the density of the particle suspension above the means for supplying secondary fluidizing gas.

4. A fluidized bed reactor comprising a vertical reactor chamber having water cooled walls enclosing a lower portion and an upper portion; a cyclone separator connected to the upper portion of said reactor chamber through an exhaust outlet; a lock connecting said cyclone separator to the lower portion of said reactor chamber; a perforated bottom in said reactor chamber; means for supplying a fluidizing gas below said perforated bottom at a rate making the reactor operate on the fast circulating principle; means for supplying secondary fluidizing gas above said perforated bottom; both of said means for supplying fluidizing gas operating in proportion to fuel occasionally introduced to said reactor; means for supplying coarse solid fuel to said reactor chamber; means for supplying fine grain inert material to said reactor chamber; valve means for selectively controlling the withdrawal of bed material from the space above said perforated bottom; further valve means for selectively controlling the withdrawal of bed material from said lock; a temperature sensor in said exhaust outlet; a governing unit connected to said temperature sensor and controlling said valve means and said further valve means; transfer means to return bed material withdrawn from said lock to said means for supplying inert material; and means for changing the ratio between said primary and said secondary gases to alter the particle density in said upper portion of the reactor.

* * * * *